(12) United States Patent
Bivens (10) Patent No.: US 7,686,952 B2
(45) Date of Patent: Mar. 30, 2010

(54) LIQUID FILTERING APPARATUS

(76) Inventor: Thomas H. Bivens, P.O. Box 1247, Magnolia, TX (US) 77357-1247

( * ) Notice: Subject to any disclaimer, the term of this patent is extended or adjusted under 35 U.S.C. 154(b) by 116 days.

(21) Appl. No.: 11/621,226

(22) Filed: Jan. 9, 2007

(65) Prior Publication Data

US 2007/0170109 A1 Jul. 26, 2007

Related U.S. Application Data

(60) Provisional application No. 60/761,444, filed on Jan. 24, 2006.

(51) Int. Cl.
*A47J 37/12* (2006.01)
(52) U.S. Cl. ............... 210/167.28; 210/416.5; 210/DIG. 8; 99/408
(58) Field of Classification Search ............ 210/167.01, 210/167.28, 416.5, DIG. 8; 99/408
See application file for complete search history.

(56) References Cited

U.S. PATENT DOCUMENTS

| 2,760,641 | A | | 8/1956 | Mies | |
|---|---|---|---|---|---|
| 3,356,218 | A | * | 12/1967 | Grudoski | 210/167.28 |
| 3,415,181 | A | * | 12/1968 | Hart | 99/408 |
| 3,447,685 | A | * | 6/1969 | Bircher | 210/167.28 |
| 3,735,693 | A | * | 5/1973 | Pelster et al. | 99/408 |
| 4,113,623 | A | * | 9/1978 | Koether et al. | 210/167.28 |
| 4,805,525 | A | | 2/1989 | Bivens | |
| RE34,636 | E | | 6/1994 | Bivens | |
| 5,340,471 | A | * | 8/1994 | Wilson et al. | 210/167.28 |
| 5,486,370 | A | * | 1/1996 | Bivens | 426/417 |
| 5,839,360 | A | * | 11/1998 | Williams | 99/408 |
| 5,870,945 | A | | 2/1999 | Bivens | |
| 6,235,210 | B1 | * | 5/2001 | Saksena | 210/791 |
| 6,306,294 | B1 | * | 10/2001 | Blair | 210/167.28 |
| 6,745,669 | B2 | * | 6/2004 | Suzuki | 99/330 |
| 2006/0076281 | A1 | * | 4/2006 | Aldeguer | 210/167 |

* cited by examiner

*Primary Examiner*—Fred Prince
(74) *Attorney, Agent, or Firm*—Keeling Patents & Trademarks LLC; Kenneth A. Keeling; Melissa M. Martinez (57) ABSTRACT

There is provided a portable liquid filtering apparatus for filtering liquid used in a container, such as cooking oil in deep fat fryers. The apparatus includes a mounting bracket that attaches to a portion of the container. The mounting bracket supports a liquid pump. A filter assembly including at least one filter element is removably disposed in the container, and is connected to the pump inlet by a suction tube. The pump draws the liquid through the filter element and suction tube and propels it into a discharge tube connected to the pump outlet. The discharge tube discharges the filtered liquid back into the container for reuse. The mounting bracket is adjustable for attachment to various sized containers. The suction tube and the discharge tube are shaped to conform generally to the shape of the container.

42 Claims, 5 Drawing Sheets

LIQUID FILTERING APPARATUS

CROSS-REFERENCE TO RELATED APPLICATIONS

This application claims the benefit of U.S. provisional application Ser. No. 60/761,444, entitled "Liquid Filtering Apparatus," filed Jan. 24, 2006, which application is incorporated herein by reference as if reproduced in full below.

STATEMENT REGARDING FEDERALLY SPONSORED RESEARCH OR DEVELOPMENT

Not Applicable.

BACKGROUND OF THE INVENTION

1. Field of the Invention

The present invention relates generally to liquid filtering apparatuses, and, more particularly, to a portable liquid filtering apparatus for use with deep fat fryers.

2. Description of the Related Art

Cooking oil is extensively used in the food industry to cook various comestibles. Animal fat or other suitable material may sometimes be used as the cooking material in lieu of cooking oil. The term "cooking oil" is used herein to designate any such material.

Frying is frequently accomplished in relatively deep containers with the comestible to be cooked immersed in the cooking oil. In cases where quantities of food are regularly cooked in such a manner, the cooking oil becomes contaminated with various particles of food or other impurities, and charred food particles produce an odor, which adversely affects the taste of foods cooked therein.

Wire mesh strainers have been long known and used to remove particulate matter from cooking oil. Strainers have not been effective, however, to remove sufficient particulate matter to provide particulate-free cooking oil, and have been demonstrated to only slightly prolong the usefulness of the cooking oil. To beneficially control free fatty acids in the cooking oil, suspended particles of the size of two (2) microns and larger should be removed from the cooking oil.

Conventional systems and apparatus for filtering cooking oil require that the cooking operation be interrupted to filter the cooking oil or to clean continuous filtering systems. A disadvantage of conventional methods of filtering cooking oil is that such methods require that the cooking operation be ceased during the period that the cooking oil is filtered. This results in significant downtime.

Overbeck, U.S. Pat. No. 2,635,527, discloses a deep frying strainer to be located at the bottom of the cooking oil container to strain food particles from cooking oil as the strainer is lifted from the container and the liquid is forced through the strainer by the action of gravity. Although beneficial to remove much particulate matter, the invention disclosed does not effectively remove smaller particulate contaminants.

U.S. Pat. No. Re. 34,636, reissued on Jun. 14, 1994, to the present inventor, describes a cooking oil filtering apparatus which can be used to effectively remove particulates from the cooking oil. Such particulates may include coatings from fried objects, seasonings and the like. The cooking oil is drawn through wire mesh screens by applying suction at the filter interior. As the cooking oil is drawn to the wire mesh screens, the screen serves to remove particulates from the cooking oil. The particulate-free cooking oil is then drawn into an outlet and drawn through the tank to a pump. The pump passes the cooking oil back into the tank. This process is carried on until particulate matter is removed from the cooking oil. A filter powder may be dispersed in the cooking oil to accumulate on the outer surfaces of the wire mesh screens. The subject apparatus eliminated the need for filter paper.

U.S. Pat. No. 5,404,799, issued on Apr. 11, 1995, and U.S. Pat. No. 5,486,370, issued on Jan. 23, 1996, both to the present inventor, describe cooking oil filtering apparatuses and methods which can be used to effectively remove particulates from the cooking oil. While effective, these apparatuses and methods require a specific fryer system, or mechanical modification of an existing fryer system.

Miles, et al, U.S. Pat. No. 2,760,641, discloses a portable filtering apparatus for use in cleaning cooking oil or other liquids. According to the Miles, et al. disclosure, the contaminated cooking oil is first drained from the cooking reservoir into a draw-off container. The filter is then submerged in the oil in the draw-off container. The oil is then pumped by the pump motor through the filter and pump. The pump discharges the oil through a discharge tube and into the cooking reservoir. This apparatus does not permit cleaning the cooking oil while it is still in the cooking reservoir, or cleaning the oil while cooking.

Not shown is a truly portable liquid filtering apparatus that permits filtering liquids in the same container in which they are used or stored. Nor a a portable filtering apparatus will permit filtering the liquids without downtime for cooling such liquids. Nor an apparatus that will further reduce downtime by allowing the liquid to be filtered while it is in use, such as during the cooking of foods therein.

BRIEF SUMMARY OF THE INVENTION

According to one embodiment of the invention, a portable liquid filtering apparatus for filtering liquid used in a container comprises a mounting bracket removably attachable to the container. A pump is associated with the mounting bracket. A filter assembly is removably disposed in the container. The filter assembly has at least one filter element. A suction tube has an inlet end in fluid communication with the filter element, and an outlet end in fluid communication with the pump for drawing liquid through the filter element for cleaning the liquid. A discharge tube has an inlet end in fluid communication with the pump, and an opposite outlet end for returning the filtered liquid to the container for reuse.

The portable liquid filtering apparatus further includes a motor for operating the pump and a motor bracket attached to the motor and to the mounting bracket. The mounting bracket is adjustably attached to the motor bracket for mounting to various sized containers. The suction tube and the discharge tube are shaped to conform generally to the shape of the container.

Accordingly, the objects of the present invention are to provide, inter alia, a portable liquid filtering apparatus that:

permits filtering liquids in the same container in which they are used or stored;

permits filtering the liquids without downtime for cooling such liquids;

allows the liquid to be filtered while it is in use, such as during the cooking of foods therein; and is lightweight and may be carried by hand from container to container, or conveniently transported by vehicle.

Other objects of the invention are apparent from the specification and claims as set forth below.

DESCRIPTION OF EXAMPLE EMBODIMENTS OF THE INVENTION

The invention and its advantages are best understood by referring to the drawings, like numerals being used for like and corresponding parts of the various drawings.

Figure 1:
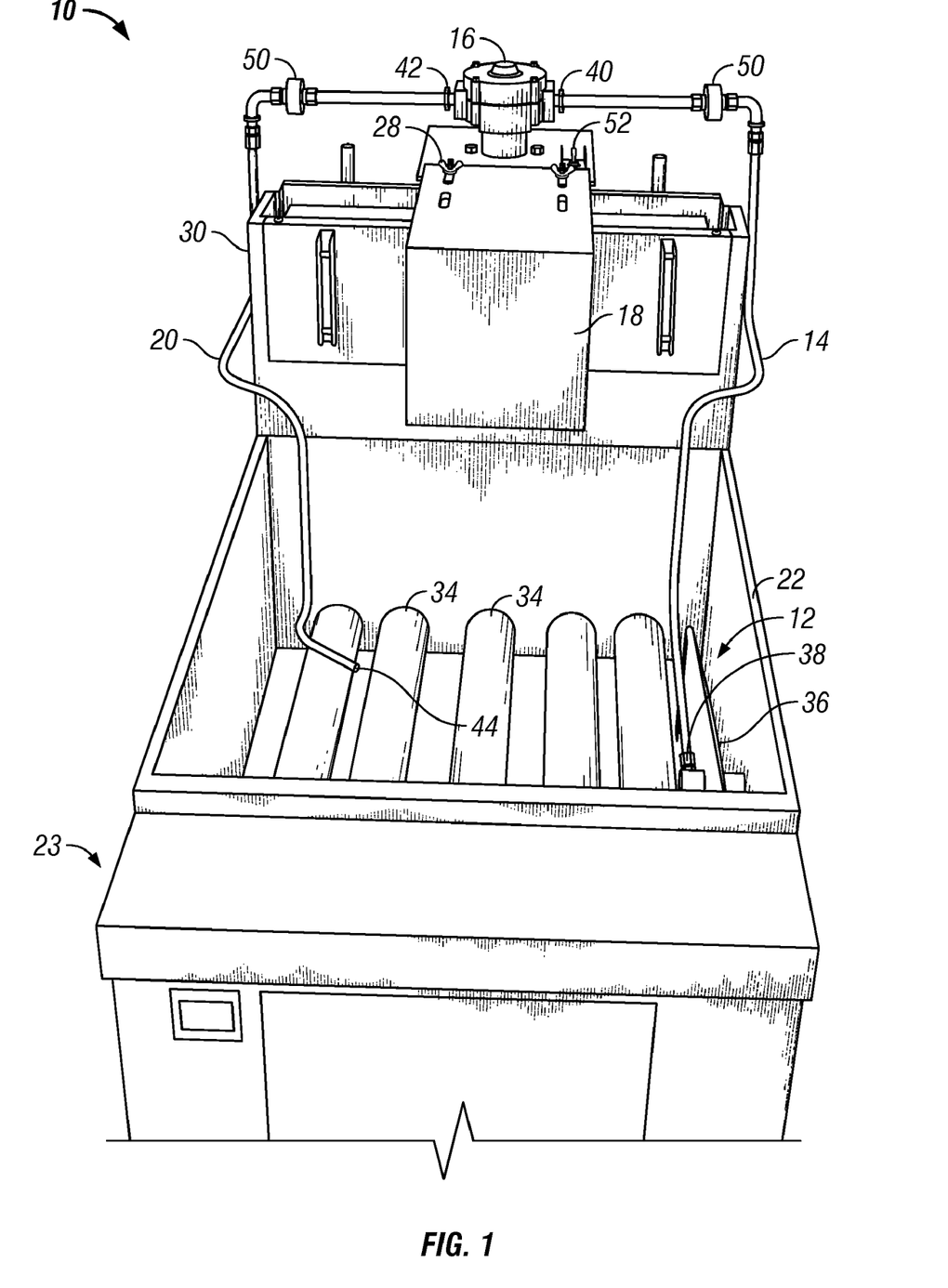
FIG. 1 is a front perspective view of an embodiment of the portable liquid filtering apparatus as installed on a deep fat fryer.

In FIG. 1, there is shown in perspective view a portable liquid filtering apparatus, generally designated 10, according to an example embodiment of the invention. Filtering apparatus 10 includes filter assembly 12, suction tube 14, pump 16, mounting bracket 18, and discharge tube 20. In the illustrated example embodiment, filtering apparatus 10 is used for filtering cooking oil (not illustrated) in tank or container 22 of deep fat fryer 23. However, in other embodiments of the invention, filtering apparatus 10 can be used in various types and sizes of containers. Each of these parts of filtering apparatus 10 are arranged so as to provide the necessary filtering of the cooking oil contained within the fryer tank 22.

Figure 2:
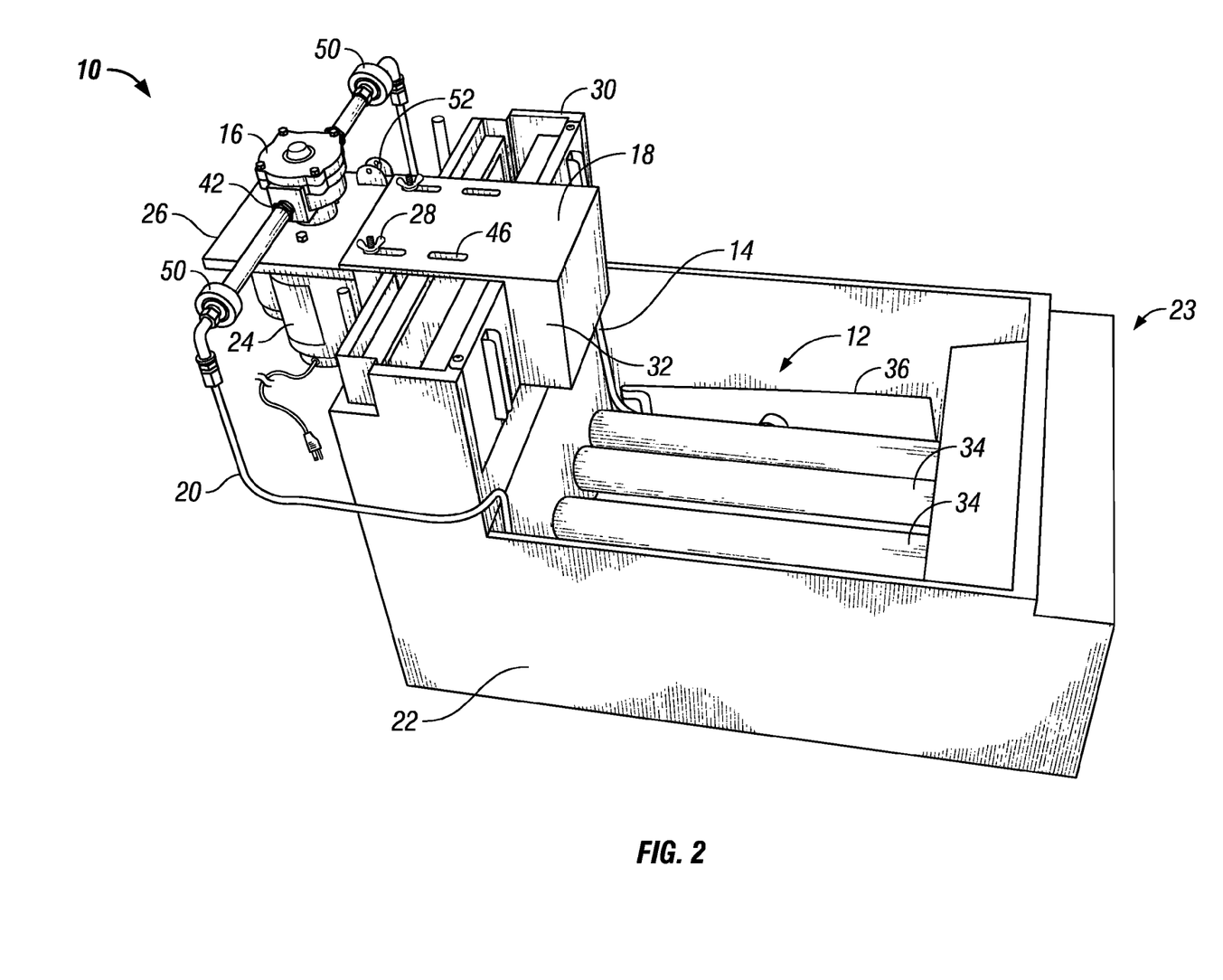
FIG. 2 is a side perspective view of the deep fat fryer and portable liquid filtering apparatus of FIG. 1.

Referring to FIG. 2, pump 16 is operated by electric motor 24 from manual or remote switch 52. Motor 24 is mounted on and supported from motor bracket 26. Motor bracket 26 is attached to mounting bracket 18 by suitable fasteners 28, such as nuts and bolts. Mounting bracket 18 is contracted and removably attachable to tank back 30 of fryer tank 22 without alteration of the structure of fryer tank 22 and without providing additional attachment means, such as bolt holes in fryer tank 22. In the illustrated embodiment, mounting bracket 18 is placed over the top of tank back 30. Slotted bolt holes 46 in mounting bracket 18 provide for lateral adjustment between mounting bracket 18 and motor bracket 26 so that filtering apparatus 10 can be mounted on tank backs 30 of various widths.

Referring again to FIG. 1, filter assembly 12 of filtering apparatus 10 is removably disposable in the bottom portion of fryer tank 22, near its heating elements 34. Filter assembly 12 includes filter element 36 for removing contaminants from the cooking oil. Filter assemblies and filter elements suitable for use in the present invention are well known in the cooking and liquid filtering arts. In one embodiment, filter element 36 is stainless steel. Filter assembly 12 is connected to pump 16 by suction tube 14. The inlet end 38 of suction tube 14 is in fluid communication with filter element 36, and outlet end 40 of suction tube 14 is in fluid communication with pump 16. Suction tube 14 connects to filter assembly 12 at cap 48, as best seen in FIG. 3.

The inlet end 42 of discharge tube 20 is connected to and in fluid communication with the discharge port of pump 16. Filtered cooking oil is returned to fryer tank 22 for reuse through the outlet end 44 of discharge tube 20. In the embodiment illustrated in FIG. 1, outlet end 44 of discharge tube 20 is submerged in the cooking oil and placed near the bottom of fryer tank 22. As best seen in FIG. 1, suction tube 14 and the discharge tube 20 are shaped to conform generally to the shape of fryer tank 22. In various embodiments, suction tube 14 and discharge tube 20 are made from aluminum, stainless steel, or copper tube.

One of the novel features of the present invention is that filtering apparatus 10 is adaptable for use with different size deep fat fryers 23. First, as discussed above, mounting bracket 18 is adjustable to fit tank backs 30 of various widths. Second, in one embodiment of the invention, suction tube 14 and discharge tube 20 have flexible lower portions, and may be bent by hand to fit within tanks 22 of various sizes of deep fat fryers 23. Third, quick disconnects 50 in suction tube 14 and discharge tube 20 permit relative rotation of the parts of these tubes, permitting further flexibility for use with various sized or shaped fryers 23.

Figure 3:
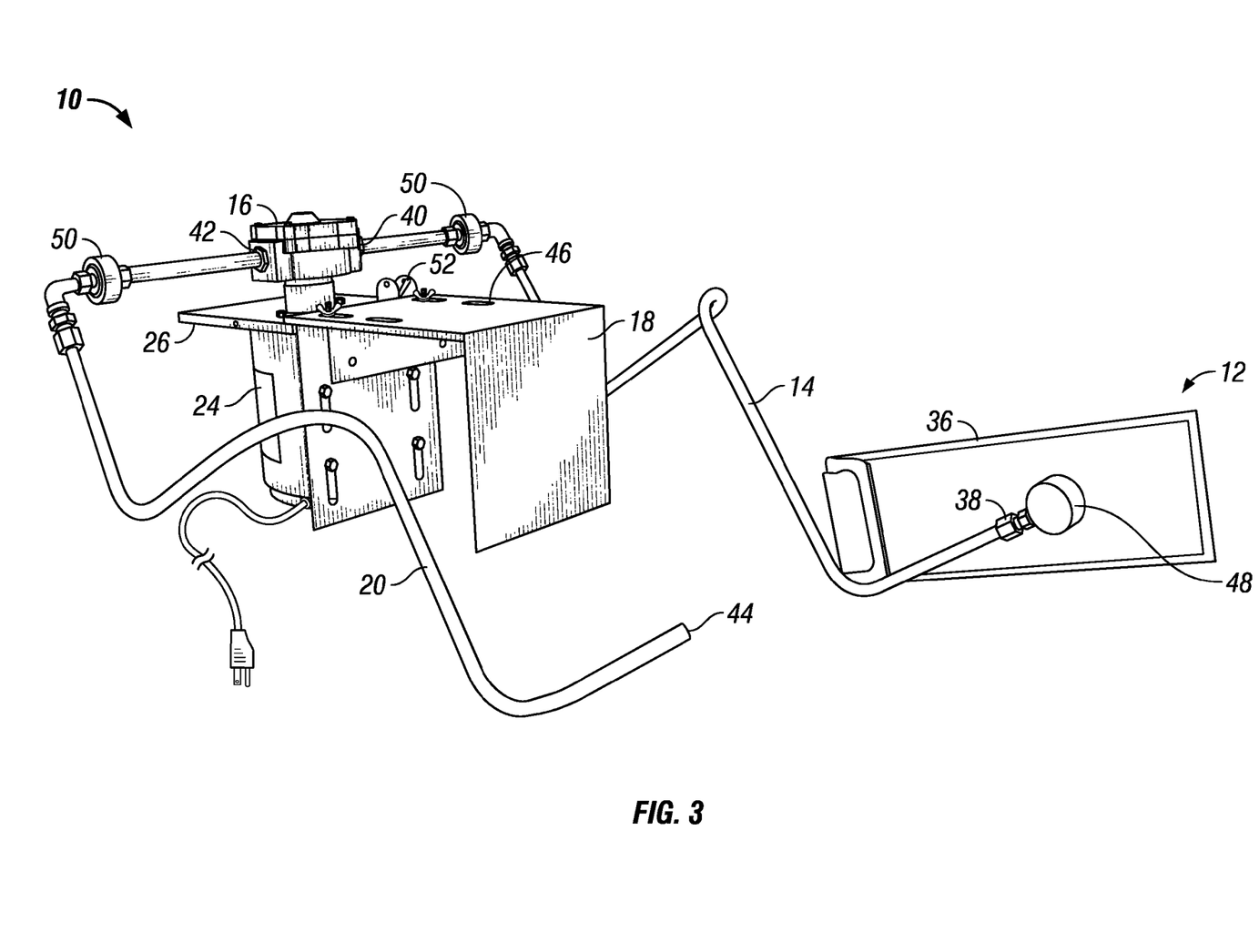
FIG. 3 is a perspective view of the portable liquid filtering apparatus of FIGS. 1 and 2.

FIG. 3 illustrates the portable liquid filtering apparatus of FIGS. 1 and 2 as it appears when removed from deep fat fryer 23.

Figure 4:
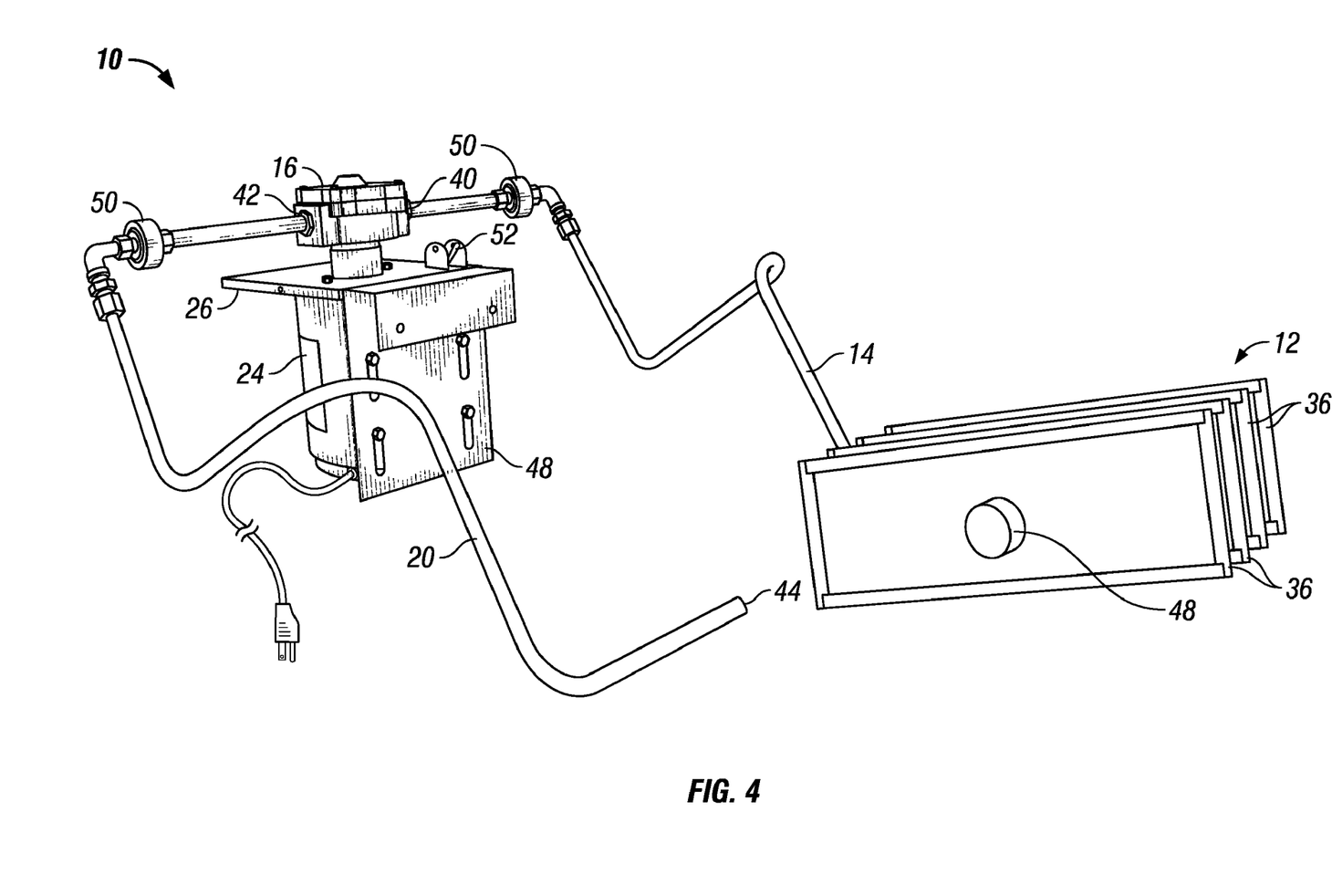
FIG. 4 is a perspective view of a portable liquid filtering apparatus according to an alternative embodiment of the invention.

Referring to FIG. 4, in another alternative embodiment of the invention, filter assembly 12 includes multiple filter elements 36.

Figure 5:
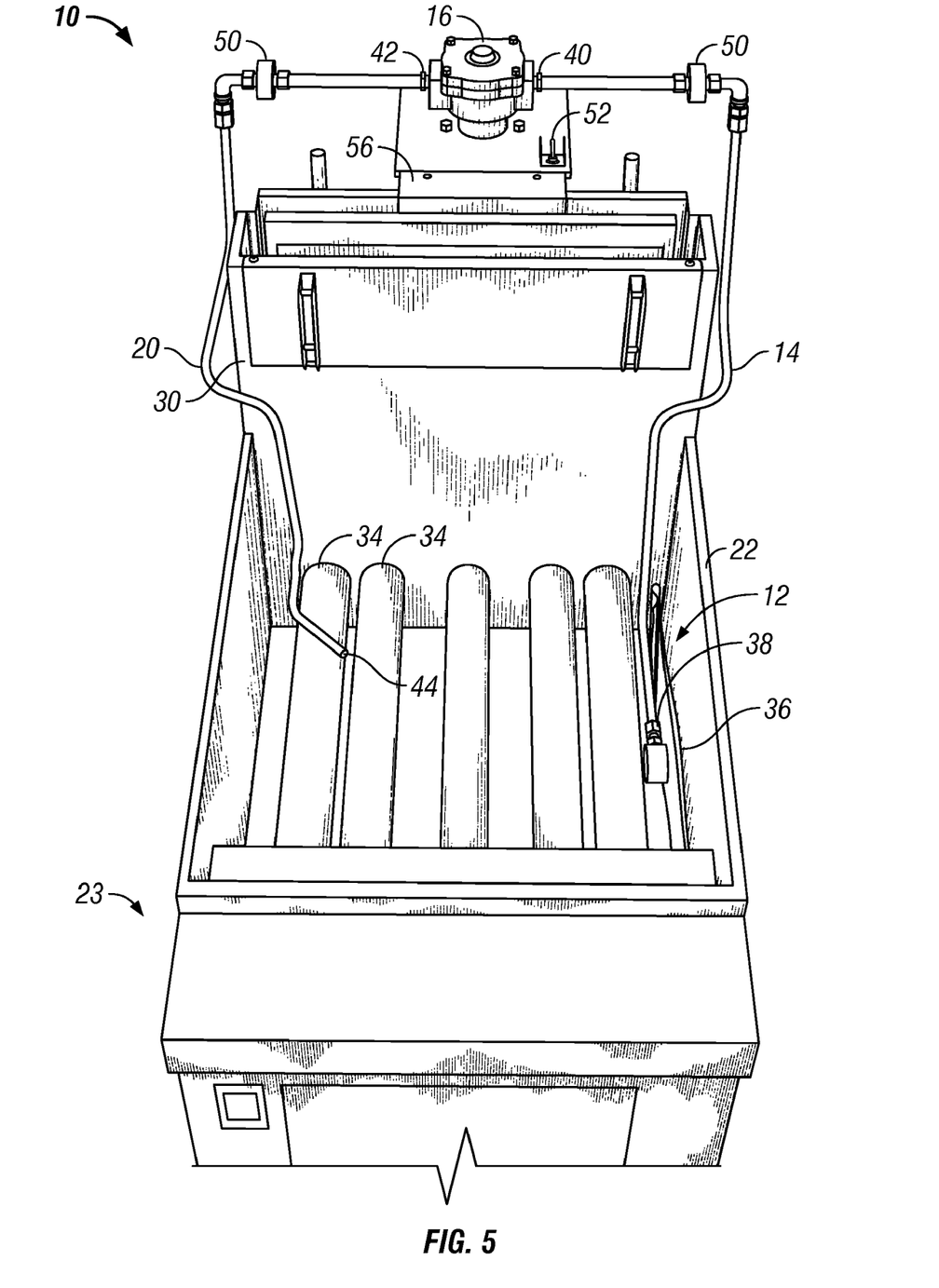
FIG. 5 is a front perspective view of a deep fat fryer in which is installed a portable liquid filtering apparatus according to another alternative embodiment of the invention.

FIG. 5 illustrates still another embodiment of the invention in which mounting bracket 56 is supported from the rear portion of tank back 30 of fryer tank 22. Mounting bracket 56 is a standard mounting bracket for gas fueled deep fat fryers.

In one example embodiment of the invention, pump 16 is a positive displacement pump, as provided by Baker Company as model number 8-D. Motor 24 is a direct drive induction motor as provided by Haight Company as model number S-29. Filter assembly 36 is a stainless steel wire mesh filter, as manufactured by Permafil Inc.

Suction tube 14 and discharge tube 20 are of ½ inch outer diameter and ⅜ inch inner diameter stainless steel. Mounting bracket 18 is made from 16 gauge stainless steel plate. In the example embodiment, mounting bracket is 7.5 inches wide and 10.5 inches high.

The invention is described and illustrated herein as it might be used with a gas fueled deep fat fryer, in which a single filter assembly is used and is vertically oriented due to space constraints. However, it is to be understood that the invention is also applicable to electric fueled fryers, and that in other embodiments of the invention the filter assembly is mounted horizontally or diagonally in the fryer container, and in other embodiments multiple filter assemblies are used.

Installation and Operation

Portable liquid filtering apparatus 10 is installed on a deep fat fryer 23 by first inserting filter assembly 12 and the lower portions of suction tube 14 and discharge tube 20 into tank 22 of fryer 23. Mounting bracket 18 is then placed over tank back 30, and is adjusted and tightened flush against tank back 30 by means of fasteners 28. The power cord of motor 24 is then connected to a source of electric power.

In operation, when contaminated cooking oil in fryer tank 22 is to be cleaned, motor 24 is started from manual or remote switch 52 starting pump 16. Pump 16 draws cooking oil through filter element 36 of filter assembly 12 and into suction tube 14. Contaminants in the cooking oil are removed by filter element 36. Pump 16 draws the filtered oil up through suction tube 14 and passes it into discharge tube 20. The oil is redeposited into tank 22 of deep fat fryer 23 from open end 44 of discharge tube 20.

After filtering the cooking oil in fryer tank 22, portable liquid filtering apparatus 10 may be easily removed from fryer 23 by merely unplugging the power cord and loosening fasteners 28 on mounting bracket 18. Filtering apparatus 10 then available for immediate reuse in cleaning the cooking oil in another deep fat fryer. Advantageously, filtering apparatus 10 is lightweight and may be carried by hand from fryer to fryer, or conveniently transported by vehicle from place to place.

Alternatively, filtering apparatus 10 may be left installed indefinitely on one deep fat fryer 23 for use whenever the oil therein requires cleaning. It should be noted that it is not necessary to first cool the cooking oil before filtering it with apparatus 10, as is the case with many prior filtering methods. Also, advantageously, filtering apparatus 10 may be used in a continuous manner while the oil is kept at cooking temperature, and even while food is being cooked in fryer 23. This use is particularly advantageous in restaurants requiring high volume cooking with a minimum number of deep fat fryers.

While the embodiments of the invention described and illustrated herein relate to the use of the invention for filtering cooking oil in deep fat fryers, the portable liquid filtering apparatus of this invention may also advantageously be used for filtering other liquids used or stored in containers, particularly industrial liquids containing suspended solids.

The portable liquid filtering apparatus of the present invention, and many of its intended advantages, will be understood from the foregoing description of example embodiments, and it will be apparent that, although the invention and its advantages have been described in detail, various changes, substitutions, and alterations may be made in the manner, procedure, and details thereof without departing from the spirit and scope of the invention, as defined by the appended claims, or sacrificing any of its material advantages, the forms hereinbefore described being merely exemplary embodiments thereof.

I claim:

1. A liquid filtering apparatus for filtering a liquid, the apparatus comprising:
    a deep fat fryer having a fryer tank with a first side wall and a second side wall;
    a portable filtering apparatus comprising a filter assembly, an apparatus for removing the liquid from the fryer tank, an apparatus for passing the liquid through the filter assembly, and an apparatus for returning the liquid to the fryer tank;
    the filter assembly removably disposed within the fryer tank, the filter assembly having at least one filter element, wherein the filter assembly is disposed intermediate the first side wall and a heating element in the fryer tank;
    the apparatus for passing the liquid through the filter assembly, wherein the apparatus for passing the liquid through the filter assembly is disposed exterior of the fryer tank and comprises a pump associated with the at least one filter element;
    the apparatus for removing the liquid from the fryer tank and comprising a suction conduit having an inlet end and an opposite outlet end, wherein the inlet end is in fluid communication with the filter assembly and the outlet end is in fluid communication with the apparatus for passing the liquid through the filter assembly, and wherein the filter element is coupled to the pump by the suction conduit; and
    the apparatus for returning the liquid to the fryer tank having an inlet end and an opposite outlet end, wherein the inlet end is in fluid communication with the apparatus for passing the liquid through the filter assembly and the outlet end is positioned within the fryer tank.

2. The apparatus of claim 1, wherein the portable filtering apparatus is removably attached to the deep fat fryer.

3. The apparatus of claim 1, wherein the suction conduit is shaped to conform generally to the shape of the deep fat fryer.

4. The apparatus of claim 1, wherein the suction conduit comprises drawn aluminum.

5. The apparatus of claim 1, wherein the suction conduit comprises stainless steel.

6. The apparatus of claim 1, wherein the filter assembly is disposed proximate the first side wall of the fryer tank and wherein the outlet end of the apparatus for returning the liquid to the fryer tank is disposed proximate the second side wall.

7. The apparatus of claim 6, wherein the apparatus for removing the liquid from the fryer tank comprises a suction tube.

8. The apparatus of claim 7, wherein the suction tube comprises drawn aluminum.

9. The apparatus of claim 7, wherein the suction tube comprises stainless steel.

10. The apparatus of claim 7, further comprising:
    the fryer tank having a rear wall intermediate the first and second side walls;
    wherein the suction tube, proximate the inlet end, is disposed proximate the rear wall of the fryer tank.

11. The apparatus of claim 7, further including a discharge tube having an inlet end in fluid communication with the pump, and an opposite outlet end.

12. The apparatus of claim 11, wherein the discharge tube, proximate the outlet end, is disposed proximate the rear wall of the fryer tank, and where the suction tube, proximate the inlet end, is disposed proximate the rear wall of the fryer tank.

13. The apparatus of claim 11, wherein the discharge tube comprises drawn aluminum.

14. The apparatus of claim 11, wherein the discharge tube comprises stainless steel.

15. The apparatus of claim 11, wherein the discharge tube is shaped to conform generally to the shape of the deep fat fryer.

16. The apparatus of claim 11, wherein the outlet end of the discharge tube terminates above the liquid surface.

17. A deep fat fryer system comprising:
    a deep fat fryer having a fryer tank with a first side wall and a second side wall; and
    a filtering apparatus to filter a liquid and coupled to the deep fat fryer, the filtering apparatus comprising:
        a filter assembly disposed within the fryer tank, the filter assembly having at least one filter element;
        a pump disposed exterior to the fryer tank and configured to pass the liquid through the filter assembly;
        a first apparatus configured to remove the liquid from the fryer tank, the first apparatus having an inlet end and an opposite outlet end, wherein the inlet end is in fluid communication with the filter assembly, and wherein the opposite outlet end is in fluid communication with the pump; and
        a second apparatus configured to return the liquid to the fryer tank, the second apparatus having an inlet end and an opposite outlet end, wherein the inlet end is in fluid communication with the pump, and wherein the opposite outlet end is positioned within the fryer tank; and
        a mounting bracket associated with the pump for removably supporting the pump from the deep fat fryer.

18. The apparatus of claim 17, further including:
a motor for operating the pump; and
a motor bracket attached to the motor, wherein the mounting bracket is attached to the motor bracket.

19. The apparatus of claim 18, wherein the mounting bracket is adjustably attached to the motor bracket for mounting to various sized deep fat fryers.

20. A liquid filtering apparatus for filtering a liquid, the apparatus comprising:
a deep fat fryer having a fryer tank with a first side wall and a second side wall;
a filtering apparatus comprising a filter assembly, a suction tube, a pump, and a discharge tube;
the filter assembly removably positioned within the fryer tank, the filter assembly having at least one filter element;
the pump removably attachable to the deep fat fryer, the pump located exterior of the fryer tank;
the suction tube having an inlet end in fluid communication with the filter assembly and an outlet end in fluid communication with the pump;
the discharge tube having an inlet end in fluid communication with the pump and an opposite outlet end for returning the liquid to the fryer tank for reuse; and
a mounting bracket associated with the pump and configured to removably attach the pump to the back of the deep fat fryer, wherein the filtering apparatus is removably attached to the deep fat fryer the mounting bracket and pump.

21. The apparatus of claim 20, further including:
a motor for operating the pump; and
a motor bracket attached to the motor, wherein the mounting bracket is attached to the motor bracket.

22. The apparatus of claim 21, wherein the mounting bracket is adjustably attached to the motor bracket for mounting to various sized deep fat fryers.

23. The apparatus of claim 20, wherein the outlet end of the discharge tube is submerged in the liquid proximate the second side wall.

24. The apparatus of claim 20, wherein the outlet end of the discharge tube terminates above the liquid surface.

25. The apparatus of claim 20, wherein the suction tube and the discharge tube comprise drawn aluminum.

26. The apparatus of claim 20, wherein the suction tube and the discharge tube comprise stainless steel.

27. The apparatus of claim 20, wherein the suction tube and the discharge tube are shaped to conform generally to the shape of the deep fat fryer.

28. The apparatus of claim 27, wherein the suction tube and the discharge tube extend laterally from opposite sides of the pump and pass around the exterior sides of at least a portion of the deep fat fryer, and wherein the fryer tank having a rear wall intermediate the first and second side walls, wherein the suction tube, proximate the inlet end, is disposed proximate the rear wall, and wherein the discharge tube, proximate the outlet end, is disposed proximate the rear wall of the fryer tank.

29. The apparatus of claim 28, wherein the suction tube and the discharge tube enter the deep fat fryer from opposite sides thereof.

30. The apparatus of claim 29, wherein at least portions of the suction tube and the discharge tube are bendable, and wherein the filter assembly is disposed intermediate the first side wall and a heating element contained within the fryer tank.

31. The apparatus of claim 28, wherein the lateral extensions of the suction tube and the discharge tube from the pump are rigid.

32. A method of using a filtering apparatus, the method comprising:
providing a filtering apparatus for connection to a deep fat fryer having a fryer tank, said portable filtering apparatus comprising a filter assembly functionally connected to a suction tube at the suction tube's inlet end, said suction tube having an outlet end functionally connected to a pump, wherein the pump is located exterior to the fryer tank, the pump is functionally connected to the inlet end of a discharge tube having the inlet end and an opposed outlet end;
inserting the filter assembly and the outlet end of the discharge tube into the fryer tank; and
mounting the portable filtering apparatus to the deep fat fryer proximate the pump, wherein mounting comprises mounting the filtering apparatus to the back of the deep fat fryer.

33. The method of claim 32, further comprising the steps of:
pumping a liquid contained within the fryer tank through the filter assembly and the suction tube thereby removing the filtered liquid from the fryer tank; and
discharging the filtered liquid through the discharge tube back into the fryer tank.

34. The method of claim 33, further comprising filtering the liquid contained within the fryer tank.

35. The method of claim 34, wherein filtering occurs at least a portion of time the fluid contained within the fryer tank is kept at an appropriate temperature for frying comestibles.

36. The method of claim 33, further comprising cooking comestibles in the liquid contained within the fryer tank.

37. The method of claim 36, wherein the cooking step is performed during the pumping step, the filtering step, the removing step, and the discharging step.

38. The method of claim 32, further comprising the step of:
removing the portable filtering apparatus from the deep fat fryer.

39. A method of using a portable filtering apparatus, the method comprising:
providing a portable filtering apparatus for connection to a deep fat fryer having a fryer tank, said portable filtering apparatus comprising a filter assembly functionally connected to a suction tube at the suction tube's inlet end, said suction tube having an outlet end functionally connected to a pump, wherein the pump is located exterior to the fryer tank, the pump is functionally connected to the inlet end of a discharge tube having the inlet end and an opposed outlet end;
inserting the filter assembly and the outlet end of the discharge tube into the fryer tank;
mounting the portable filtering apparatus to the deep fat fryer;
inserting the filter assembly and the outlet end of the discharge tube of the portable filtering apparatus into a second fryer tank; and
mounting the portable filtering apparatus to the second deep fat fryer.

40. A filtering apparatus configured to filter a liquid and to be coupled to a deep fat fryer, wherein the deep fat fryer comprises a fryer tank with a first side wall and a second side wall, and wherein the filtering apparatus comprises: a filter assembly configured to be disposed within the fryer tank, the filter assembly having at least one filter element; a pump configured to be disposed exterior to the fryer tank and to pass the liquid through the filter assembly; a first conduit to transport the liquid from the fryer tank and having an inlet end and an opposite outlet end, wherein the inlet end is configured to be in fluid communication with the filter assembly, and wherein the opposite outlet end is configured to be in fluid communication with the pump; a second conduit to return the liquid from the pump to the fryer tank and having an inlet end and an opposite outlet end, wherein the inlet end is configured to be in fluid communication with the pump, and wherein the opposite outlet end is configured to be positioned within the fryer tank; and a mounting bracket associated with the pump for removably supporting the pump from the deep fat fryer.

41. The apparatus of claim 40, wherein the filtering apparatus is configured to mount to a back of the deep fat fryer.

42. The apparatus of claim 40, wherein the filtering apparatus is configured to mount to a back of the deep fat fryer at via the mounting bracket.

* * * * *